July 8, 1924.　　　　　　C. M. LARSEN　　　　　　1,501,005
STOOL
Filed June 4, 1923　　　　　2 Sheets-Sheet 1
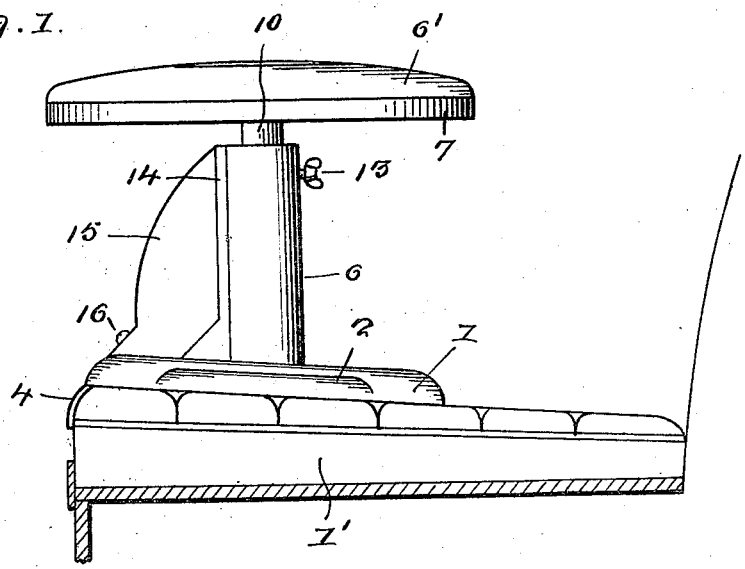
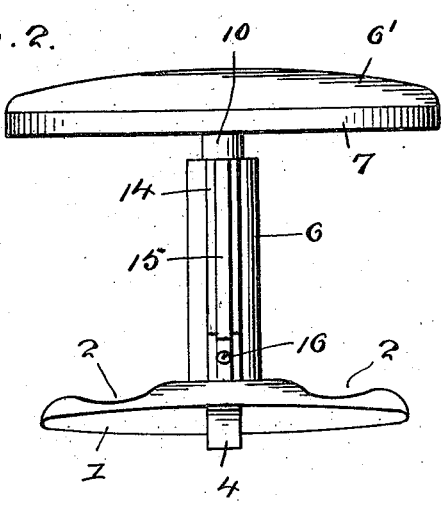
WITNESS:
E. R. Ruppert.
C. M. Larsen
INVENTOR
BY Victor J. Evans
ATTORNEY July 8, 1924.

C. M. LARSEN

STOOL

Filed June 4, 1923

C. M. Larsen
INVENTOR

BY Victor J. Evans
ATTORNEY

WITNESS:

Patented July 8, 1924.

1,501,005

UNITED STATES PATENT OFFICE.

CARL M. LARSEN, OF GLYNDON, MINNESOTA.

STOOL.

Application filed June 4, 1923. Serial No. 643,381.

*To all whom it may concern:*

Be it known that I, CARL M. LARSEN, a citizen of the United States, residing at Glyndon, in the county of Clay and State of Minnesota, have invented new and useful Improvements in Stools, of which the following is a specification.

This invention has reference to a spare seat for automobiles and is designed to rest upon an automobile seat between the legs of the occupant of the seat so that the user of the spare seat may comfortably travel in the machine without discomfort to the other occupants thereof.

A further object is to produce an extra or spare seat for automobiles in the nature of a stool having a base upon which the legs of the occupant of the automobile seat rest and which is provided with a pedestal having a vertically adjustable seat supporting post therein to be occupied by the extra passenger, the base having means to trip the outer edge of the seat cushion and being provided with an outwardly extending web in the path of contact with the legs of the occupant of the automobile seat whereby the stool can be effectively held on the automobile seat and the necessity of the extra passenger resting or sitting upon the legs of another passenger will be effectively obviated.

To the attainment of the foregoing and other objects which will present themselves as the nature of the invention is better understood, reference is to be had to the drawings which accompany and which form part of this application.

In the drawings:—

Figure 1 is a view showing the improvement applied on the seat of an automobile.

Figure 2 is a side elevation of the improvement.

Figure 3:
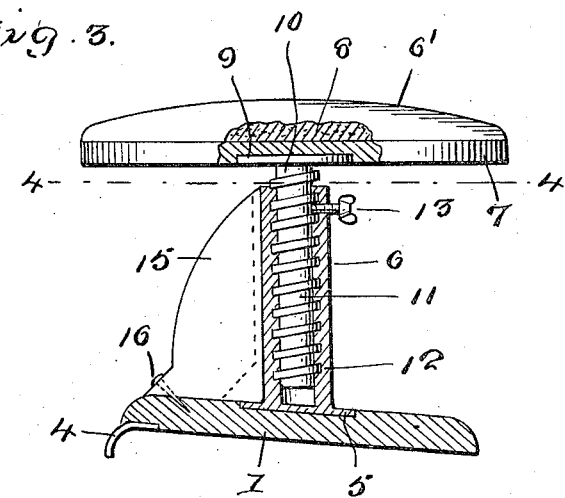
Figure 3 is a sectional view on the line 3—3 of Figure 2.
Figure 4:
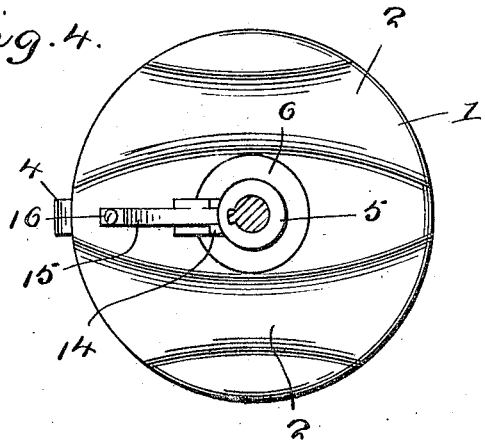
Figure 4 is a sectional view on the line 4—4 of Figure 3.

Referring now to the drawings in detail, the numeral 1 designates the cushioned seat of an automobile.

In carrying out my improvement, I make use of a base 1 which has its upper surface at points equi-distant from its center rounded downwardly, as at 2. On its outer edge, the base 3 is provided with a hook 4 to engage the outer edge of the cushioned seat 1. Thus the base is arranged at the same angle as the seat 1.

The base upon its straight upper face is centrally formed with a recess in which is seated the flanged lower or base portion 5 of a hollow pedestal 6. The pedestal is arranged at an angle with respect to its base so that the same will assume a vertical position when arranged in the automobile. The bottom flange or base 5 of the pedestal is screwed or otherwise secured to the base 2.

The auxiliary seat or stool proper includes a rounded top 7 which is preferably constructed of wood and which has arranged thereover a fabric covering 6. Between the covering and the body of the top there is a stuffing 8 of soft material.

Let in a suitable recess in the under face of the body 7 of the seat and secured thereto by screws or the like is the flanged upper end 9 of a post 10. The post has its lower end formed with threads 11 to engage with inner threads 12 in the pedestal 6. By adjusting the post in the pedestal the seat 7 may be regulated with respect to the base 2 thereof.

The pedestal has a threaded opening for the reception of a binding screw 13 whereby the post 10 is held from accidental turning. On its front face the pedestal is centrally formed with a guide 14 which is substantially U-shaped in cross section and in this guide and resting on the base 2 there is a plate 15 whose outer edge is rounded and whose lower and outer corner is secured to the base by a screw or similar element 16. In operation a passenger rests on the seat 1 and arranges the base 2 of the axiliary seat or stool between his legs. The hook 4, as previously stated, is brought to engage with the outer edge of the seat cushion. The seat portion of the stool or auxiliary seat is adjusted for the convenience of the seated passenger and for the convenience of the extra passenger who is to occupy the same. By providing the device with the plate 15 the legs of the passenger may be brought to contact therewith to hold the auxiliary seat from accidental turning on the automobile seat. The stool can be used between two passengers as well as in the lap of a single passenger.

Having described the invention, I claim:—

In a device for the purpose set forth, an angularly disposed base designed to rest on the seat of an automobile, a hook on the outer portion thereof to engage the cushion of the automobile seat, a hollow pedestal arising centrally from the base having inner threads, a cross sectionally U-shaped guide on the outer face of the pedestal, a plate receiver therein and secured to the base, a cushioned seat, a threaded post depending therefrom received in and engaging the threads of the pedestal, and means for locking the post adjusted in the pedestal.

In testimony whereof I affix my signature.

CARL M. LARSEN.